July 10, 1962   M. E. BROWN ETAL   3,043,181
TELESCOPIC FINDER FOR MOTION PICTURE CAMERAS
Filed Nov. 25, 1959   2 Sheets-Sheet 1
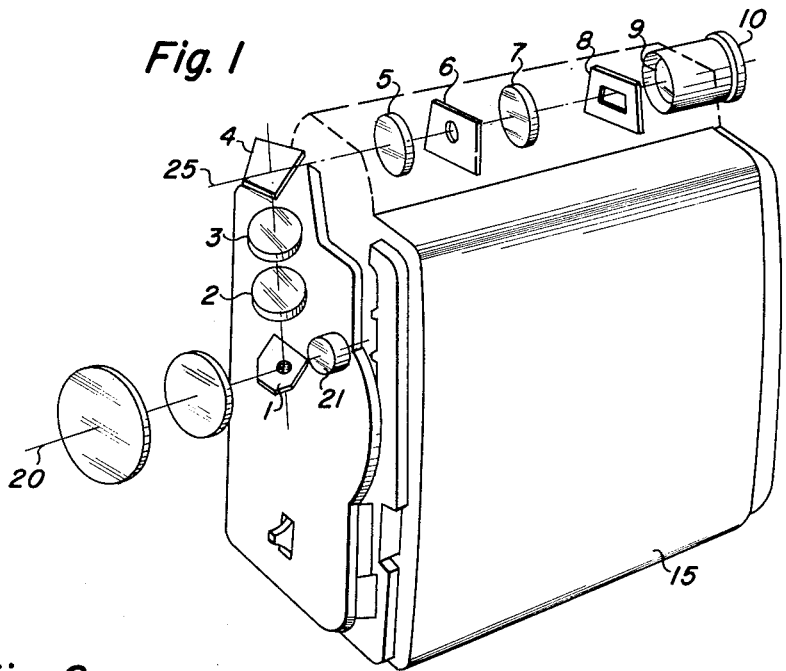
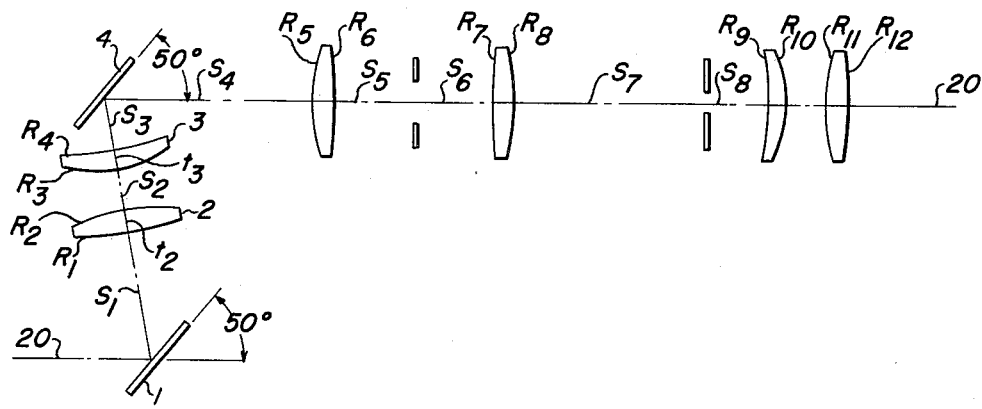
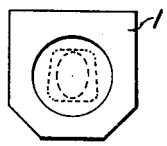
MORRIS E. BROWN
WILLIAM A. MARTIN
INVENTORS
BY R. Frank Smith
F. W. Emerson Holmes
ATTORNEYS

Fig. 3

| MAGN. = 1.00 | | | | |
|---|---|---|---|---|
| ELEMENTS | N | V | RADII | THICKNESS |
| 1 | MIRROR | | | $S_1 = 30.02$mm |
| 2 | 1.492 | 57.4 | $R_1 = +60.41$mm | $t_2 = 2.94$ |
| | | | $R_2 = -25.00$ | $S_2 = 9.00$ |
| 3 | 1.492 | 57.4 | $R_3 = +15.96$ | $t_3 = 2.75$ |
| | | | $R_4 = +50.00$ | $S_3 = 7.53$ |
| 4 | MIRROR | | | $S_4 = 44.14$ |
| 5 | 1.492 | 57.4 | $R_5 = +23.80$ | $t_5 = 3.11$ |
| | | | $R_6 = -80.20$ | $S_5 = 15.12$ |
| 6 | APERTURE STOP | | | $S_6 = 15.12$ |
| 7 | 1.492 | 57.4 | $R_7 = +80.20$ | $t_7 = 3.11$ |
| | | | $R_8 = -23.80$ | $S_7 = 35.19$ |
| 8 | FIELD STOP | | | $S_8 = 14.5 \pm$ |
| 9 | 1.492 | 57.4 | $R_9 = -50.00$ | $t_9 = 2.75$ |
| | | | $R_{10} = -15.96$ | $S_9 = 9.00$ |
| 10 | 1.492 | 57.4 | $R_{11} = +25.00$ | $t_{10} = 2.94$ |
| | | | $R_{12} = -60.41$ | $E.P. = 23.0 \pm$ |

MORRIS E. BROWN
WILLIAM A. MARTIN

INVENTORS

3,043,181
TELESCOPIC FINDER FOR MOTION PICTURE CAMERAS

Morris E. Brown and William A. Martin, Rochester, N.Y., assignors to Eastman Kodak Company, Rochester, N.Y., a corporation of New Jersey
Filed Nov. 25, 1959, Ser. No. 855,402
5 Claims. (Cl. 88—1.5)

This invention relates to photographic cameras and particularly to a telescopic finder suitable for use on motion picture cameras.

The object of this invention is to provide a telescopic finder particularly adapted for use with a movie camera having a standard objective and a substantially afocal converter such as a zoom converter in front of the standard lens, in which the eye piece of the finder is at a convenient location adjacent to the back of the camera and the field being photographed is viewed through the converter system, eliminating parallax between the viewfinder and the taking system. Furthermore, in the case of a zoom attachment, the field viewed through the viewfinder corresponds in angle at all times to the field being photographed. By "substantially afocal" converter is meant a converter which is so adjusted that it does not alter the focus of the objective lens with which it is used. If the objective is focused at infinity, the converter is strictly afocal since it receives parallel light and the emergent light is still parallel.

On the other hand, a small movie camera using a fixed focus objective lens is usually adjusted so that the lens is focused on objects at about 20 feet distance from the lens. The depth of field of the lens then allows objects at any distance from about 10 feet out to infinity to appear in satisfactorily sharp focus. A converter is then attached to the objective lens and adjusted so that the system is still focused on objects at about 20 feet distance and objects at any distance from about 10 feet to infinity still appear in satisfactorily sharp focus. Such a converter would not be strictly afocal (i.e. zero focusing power with respect to light from infinity) but parallel light entering it would emerge so close to parallel that it is effectively and substantially afocal. The zoom attachment described in copending application Serial No. 855,415, filed concurrently herewith by one of us is a suitable zoom converter for this purpose. Cross reference is also made to concurrently filed application Serial No. 855,429 by W. H. Price having to do with the optical design thereof. Such a zoom converter will vary the effective focal length of the system without affecting the distance of the focal point.

A particular object of the invention is to provide a telescopic finder of the above type in which a minimum amount of light is taken from the picture-forming beam and a minimum amount of interference takes place with the effective setting of the diaphragm opening.

A further object of the invention is to provide a combination camera objective and viewfinder system in which both systems operate at maximum optical efficiency and without deterioration of the camera image at small apertures. High optical efficiency in such a combination tends to introduce such deterioration, as discussed below.

Telescopic finders are known in which the eye piece of the telescope is located conveniently near the back of the camera, a location particularly important in the case of motion picture cameras in which the camera body extends several inches back from the objective lens mount. It is also known to provide reflectors for diverting light from the image-forming beam for use in the viewfinder. This is done either with a partially transparent mirror or with a fully reflecting mirror which intercepts the image forming rays only part of the time. It is also known to have a mirror inserted between a lens attachment and the main lens to reflect light aside for viewfinder purposes, but a peculiar advantage is gained in the case of a zoom converter attachment which does not accrue when the attachment is a fixed magnification type, and this advantage is that the apparent field of view in the viewfinder changes in exact correspondence to the change in magnification of the zoom converter when it is adjusted from low magnification to high magnification or vice versa. With regard to the partially transparent mirror which intercepts some of the image-forming rays and reflects them into the viewfinder, it is usual to coat the mirror with a light coating of silver or preferably with an optical interference layer which reflects the rays to which the eye is highly sensitive and transmits the rays to which the photographic film is more sensitive. Maximum efficiency in the viewfinder system is gained by having the entrance pupil thereof at the beam splitter and filled fully by light from the beam splitter. For such purposes, it has been proposed to provide a very small spot of fully silvered area at the center of a partially transparent mirror and to arrange the viewfinder optics so that this small spot of silver constitutes the entrance pupil of the viewfinder system. This arrangement has the advantage that only a small part of the area of the mirror is reflecting but it has the decided disadvantage that as the main objective lens is stopped down to its smallest effective opening, the light transmitted is suddenly cut off and it may easily happen that the user does not get any picture at all. Even if this does not happen, the amount of light transmitted by the lens (i.e. its effective aperture), changes very rapidly with a very small change in the diaphragm adjustment just at that end of the adjustment scale at which a very slow change is desired for accurate setting. Furthermore, the doughnut (annular) shaped cross section of the beam, entering the camera objective introduces a definite deterioration of image quality.

According to the present invention, the above described disadvantages of the small spot of silver are overcome, and its advantages are completely retained, by providing a partially transparent mirror in which a spot at the center is lightly silvered or provided with an interference coating so that it reflects about 40% of the light and transmits about 60% of the light; a range of 25% to 75% transmission gives useful results. We have discovered that this arrangement not only obviates the sudden cutting off of light mentioned above but actually makes the setting of the diaphragm at small openings easier because the diaphragm has to be opened up one and one-third times as far at very small openings to admit the same amount of light as is admitted without a partially reflecting and partially transmitting mirror in front of the objective. In other words, instead of being compressed at this end of the range as is commonly true of diaphragm scales, and especially true of a diaphragm in which the center is effectively an opaque (fully reflecting) spot, the scale is expanded and made easier for the operator to use. Moreover, in the present invention, the reflecting spot is made somewhat larger than in the prior art proposal and still takes away less light from the formation of the image on the film. This is an advantage because it permits the location of the entrance pupil of the finder system at some distance from the partially transparent mirror while still operating at full optical efficiency.

According to a preferred embodiment of the invention, the camera system is made more compact than in the prior art by arranging the partially transparent mirror at about a 40° angle rather than 45° to the plane orthogonal to the axis and thus throwing the reflected viewfinder beam about 10° forward and allowing the beam splitter to be near the main camera objective. A fully reflecting mirror is arranged approximately parallel to the partially transparent mirror to reflect the viewfinder beam back along the camera to the exit pupil of the viewfinder. This tilting of the mirror at 40° rather than 45° takes up less space between the lens attachment and the main lens and thus makes the whole lens system more compact and permits the mirror itself to have smaller area. It is also important to keep the converter attachment close to the main objective for reasons that are explained with particular reference to a fixed magnification attachment in U.S. 2,324,057, Bennett, issued July 13, 1943.

The present invention also permits the objective of the telescopic finder to be located between the two mirrors of such a finder, preferably somewhat closer to the fully reflecting member than it is to the partially transmitting mirror in front of the main objective in order not to interfere with the incoming beam of light and the mount for attachment. It is far enough from the fully reflecting member to clear the reflected beam however. The lens system of the finder comprises the objective, an erector and an eye piece. The finder system also includes the usual frame or field limiting means at the focus of the eye-piece member for delineating the field covered by the camera. The entrance pupil of the viewfinder is defined as the image of the eye-piece aperture as formed by the objective and the erector lens in the customary way or the image of the stop in the erector lens if this happens to be the limiting stop of the system. The feature of the invention whereby the partially reflecting spot on the first mirror is slightly larger than the entrance pupil of the viewfinder permits the entrance pupil of the viewfinder system to be located a short distance above the partially transparent mirror and this feature cooperates with the location of the objective near the fully reflecting mirror to provide a convenient and compact arrangement giving a brightly illuminated field without shadowing at the edge of the field in the viewfinder.

Other objects and advantages of the invention and the operation thereof will be fully understood from the following description of a preferred embodiment thereof when read in connection with the accompanying drawings, in which:

FIG. 1 shows in schematic perspective view a viewfinder according to the invention mounted on a camera body.

FIG. 2 shows the optical system of the finder in diagrammatic axial section.

FIG. 3 is a table of the characteristics of the lens shown in FIG. 2, and

FIG. 4 is a front view of the partially transparent mirror.

FIG. 1 is a diagrammatic perspective view of a finder according to the invention mounted on a camera body 15. The optic axis 20 of the camera objective 21 enters the front of the camera in the usual way. In front of the objective 21 is a partially transparent mirror 1 which intercepts the beam of light entering the objective and reflects part of the light upward into the finder. The mirror 1 is not at exactly 45° but is about 40° from a plane orthogonal to the optical axis and thus it reflects the viewfinder beam upward and about 10° forward to aid in providing compactness. The viewfinder system is a relay telescope including an objective comprising lenses 2 and 3 which transmits light to a fully reflecting mirror 4 which is preferably a front surface mirror and which reflects the light back along the top of the camera body 15 in a beam centered upon the view finder axis 25.

An erector lens comprising lenses 5 and 7 with an aperture stop 6 receives the reflected light and relays the image formed by the objective in its focal plane to the focal plane of the eye-piece 9 and 10 as is conventionally done in terrestial telescopes. The aperture stop 6 provided in the erector member may be the effective stop of the system, and its image formed respectively in the front by lens elements in front of it and at the rear by lens elements behind it constitute respectively the entrance pupil and exit pupil of the system. Alternatively, the actual stop of the eyepiece is sometimes the effective stop and hence it is the exit pupil. In this case, the entrance pupil is the image thereof formed by the eyepiece erector and objective. In the plane of the relayed image is a mask or frame 8 outlining the field of view of the camera objective. Behind this is an eyepiece comprising lenses 9 and 10 in a focusing mount in known manner, to accommodate differences in the eyes of individual users.

FIG. 2 shows the optical parts of the viewfinder in diagrammatic axial section and comprising the partially transparent mirror 1, the objective elements 2 and 3, the fully reflecting mirror 4, the erector lens elements 5 and 7, the aperture stop 6 between them, the frame mask 8 and the eyepiece elements 9 and 10. Each mirror is at an angle of 50° to the axis or 40° to the plane orthogonal to the axis in accordance with the invention. The entrance pupil is at a distance of 23 mm. in front of the objective, and since the system is symmetrical with respect to the aperture stop 6 it has a magnification of 1.0 and the exit pupil is likewise at a distance of 23 mm. from the eyepiece lens when focused for eyes accommodated to view distant objects.

All the optical parts along the top of the camera are mounted in a housing shown in phantom view.

Shown below and also in FIG. 3 is a table of data of the optical characteristics of the viewfinder system shown in FIGS. 1 and 2. In this table the magnification is taken as equal to 1.00, the optical elements of the finder are numbered from 1 to 10 in the first column to correspond to the numbers in FIGURES 1 and 2. The refractive index N for the D line of the spectrum and the conventional dispersive index V are given for the lens elements in the second and third columns, respectively, and the elements other than lenses are identified by descriptive titles in the second and third columns. The fourth column gives the radii of curvature $R_1$ to $R_{12}$ of the lens surfaces and indicates by infinity signs that both mirrors are plane. The fifth column gives the thicknesses S of the air spaces between elements of the system, the thicknesses $t$ of the lens elements, and the eye-point distance or exit-pupil distance E.P. The ± signs on $S_8$ and E.P. indicate that these may vary during the focusing of the eye-piece. All the lens elements are made of methyl-methacrylate plastic.

[Magn. = 1.00]

| Element | N | V | Radii, mm. | Thicknesses, mm. |
|---|---|---|---|---|
| 1 | Mirror | | | $S_1 = 30.02$ |
| 2 | 1.492 | 57.4 | $R_1 = +60.41$ | $t_2 = 2.94$ |
| | | | $R_2 = -25.00$ | $S_2 = 9.00$ |
| 3 | 1.492 | 57.4 | $R_3 = +15.96$ | $t_3 = 2.75$ |
| | | | $R_4 = +50.00$ | $S_3\ 7.53$ |
| 4 | Mirror | | | $S_4 = 44.14$ |
| 5 | 1.492 | 57.4 | $R_5 = +23.80$ | $t_5 = 3.11$ |
| | | | $R_6 = -80.20$ | $S_5 = 15.12$ |
| 6 | Aperture Stop | | | $S_6 = 15.12$ |
| 7 | 1.492 | 57.4 | $R_7 = +80.20$ | $t_7 = 3.11$ |
| | | | $R_8 = -23.80$ | $S_7 = 35.19$ |
| 8 | Field Stop | | | $S_8 = 14.5\pm$ |
| 9 | 1.492 | 57.4 | $R_9 = -50.00$ | $t_9 = 2.75$ |
| | | | $R_{10} = -15.96$ | $S_9 = 9.00$ |
| 10 | 1.492 | 57.4 | $R_{11} = +25.00$ | $t_{10} = 2.94$ |
| | | | $R_{12} = -60.41$ | E.P. = $23.0\pm$ |

The entrance pupil of the viewfinder system is 23 mm. in front of the front lens surface $R_1$ and 7.02 mm. from the reflection point of the axis on the mirror 1. The objective member comprises lenses 2 and 3 and forms an image of the distant field at a distance of 6.95 mm. behind the reflection point of the viewfinder axis of the mirror 4. The diameter of the aperture stop opening is conveniently 4.12 mm. and is 1.648 times the diameter of the exit or the entrance pupil. The mask size is 6.00 by 8.10 mm. for a standard 8 mm. motion picture camera or 5.61 by 7.48 mm. to indicate the useful part of the field which will eventually be projected by an 8 mm. projector. The focal length of the objective member is 22.79 mm. and that of the eye-piece is the same.

FIG. 4 is a direct front view of the partially transparent mirror showing a partially reflecting spot on the center thereof.

If the entrance pupil of the finder system fell exactly on the center of the mirror, the cross-section on the mirror surface of the beam which eventually constitutes the viewfinder beam would be a slightly egg-shaped ellipse as shown by the dotted lines nearest the center of FIG. 4. In the design of the system, as the entrance pupil was moved upward from the mirror toward the objective i.e., to its indicated position, the effective cross-section on the mirror surface of the beam reflected into the viewfinder tended to become trapezoidal with rounded corners, as shown by the middle dotted line in FIGURE 4. In the specific example given, such a trapezoid would be the minimum reflecting area necessary to give maximum efficiency and a uniformly illuminated field in the viewfinder. In practice, the spot is made circular, as shown by the solid line circle in FIGURE 4. Such a spot shape eliminates the need for exact orientation of the spot, and does not remove appreciably more light from the main beam entering the camera objective than does the trapezoid.

Although 25% to 75% reflection gives the unusual advantage of this invention, we prefer to have the reflecting spot on the mirror reflect between 30% and 50% of the light incident on it and transmit as much of the remainder as possible.

This has the further advantage over systems in which the central spot is fully reflecting, that the main objective may be stopped down to its smallest stop without complete loss of image-forming rays and the aperture scale is effectively lengthened at the small aperture end of the scale so that the setting of small apertures is less sensitive.

Although this viewfinder system finds its greatest use in combination with a motion picture camera having an afocal attachment in front of the objective, it still operates satisfactorily when no afocal attachment is present, as may happen when the camera is provided with a removable attachment.

The optical members, particularly mirrors 1 and 4 and aperture plates 6 and 8, are made somewhat trapezoidal in shape to match the artistic shape of the housing. Further, it is desirable both for artistic reasons and for ease of operation to have the viewing axis of the telescope system in the vertical central plane of the camera body. The usual location of the camera objective in small movie cameras is such that its optical axis is displaced sidewise and lies to one side of the vertical central plane of the camera. The reflecting mirrors 1 and 4 may be rotated slightly about the vertical projection of the optical axis in their faces to deflect the upward traveling segment of the view-finder beam sidewise and thus to allow the viewing axis to be located in its most desirable position.

The invention has been described in detail with particular reference to preferred embodiments thereof, but it will be understood that variations and modifications can be effected within the spirit and scope of the invention as described hereinabove and as defined in the appended claims.

What we claim is:

1. An optical system comprising a camera objective having an axis and for receiving light from a subject and focusing it on an image plane, a telescopic finder with its axis at the exit pupil thereof approximately parallel to the objective axis, two plane parallel reflectors, one obliquely on each axis and the two oriented to intercept part of the light from the subject and by reflection at both reflectors to reflect it to said exit pupil, the objective of said finder being optically between the two reflectors and the entrance pupil of the finder being spaced in front of the front surface of said finder objective about 23/30 of the distance to said reflector on the objective axis, the latter reflector consisting of a partially reflecting, partially transmitting spot on a transparent member, the spot being effectively at least as large as said entrance pupil and smaller than the diameter of the maximum beam of light which passes through said objective, the spot having a reflectivity between .25 and .75.

2. A system according to claim 1 in which said reflectors are oriented at about 40° to a plane orthogonal to their respective axes.

3. A system according to claim 1 in which said objective includes a main lens and a substantially afocal attachment optically aligned in front of the main lens and in which said latter reflector is between the main lens and the attachment.

4. In an optical system which includes a camera objective, a telescopic viewfinder with its axis approximately parallel to that of the objective, a first reflector on the objective axis for reflecting light toward the viewfinder and a second reflector on the viewfinder axis approximately parallel to the first reflector to receive said light and reflect it through the exit pupil of the viewfinder, the objective of said telescopic viewfinder being optically between the first and second reflector, the entrance pupil thereof being optically near the first reflector and spaced therefrom a distance about 7/30 of the distance to the first surface of the objective of said telescopic viewfinder, an efficient reflecting means to constitute said first reflector comprising a partially reflecting, partially transmitting spot on a transparent member, the spot being effectively at least as large as said entrance pupil and smaller than the diameter of the maximum beam of light which passes through said objective, the spot having a reflectivity between .25 and .75.

5. The combination according to claim 4 in which the first and second reflectors are parallel to each other and are each oriented at approximately 40° to a plane orthogonal to the axis of said camera objective.

References Cited in the file of this patent

UNITED STATES PATENTS

| | | |
|---|---|---|
| 2,165,341 | Capstaff et al. | July 11, 1939 |
| 2,417,125 | Reeves | Mar. 11, 1947 |
| 2,707,423 | Back | May 3, 1955 |
| 2,811,075 | Chevallaz | Oct. 29, 1957 |
| 2,974,573 | Faasch | Mar. 14, 1961 |

FOREIGN PATENTS

| | | |
|---|---|---|
| 669,234 | Great Britain | Apr. 2, 1952 |
| 325,892 | Switzerland | Jan. 15, 1958 |